(12) United States Patent
Almbladh

(10) Patent No.: US 8,401,327 B2
(45) Date of Patent: Mar. 19, 2013

(54) APPARATUS, COMPUTER PROGRAM PRODUCT AND ASSOCIATED METHODOLOGY FOR VIDEO ANALYTICS

(75) Inventor: Johan Almbladh, Lund (SE)

(73) Assignee: Axis AB, Lund (SE)

( * ) Notice: Subject to any disclaimer, the term of this patent is extended or adjusted under 35 U.S.C. 154(b) by 847 days.

(21) Appl. No.: 12/275,758

(22) Filed: Nov. 21, 2008

(65) Prior Publication Data

US 2010/0082949 A1 Apr. 1, 2010

Related U.S. Application Data

(60) Provisional application No. 61/100,575, filed on Sep. 26, 2008.

(51) Int. Cl.
*G06K 9/40* (2006.01)
*G06T 1/00* (2006.01)

(52) U.S. Cl. ........................................ 382/260; 382/307

(58) Field of Classification Search .................. 382/304, 382/307, 300, 260
See application file for complete search history.

(56) References Cited

U.S. PATENT DOCUMENTS

| | | | | |
|---|---|---|---|---|
| 5,727,225 A * | 3/1998 | Guttag et al. | ................. | 712/224 |
| 5,764,787 A * | 6/1998 | Nickerson | ..................... | 382/107 |
| 5,822,232 A * | 10/1998 | Dulong et al. | ................ | 708/308 |
| 6,944,745 B2 * | 9/2005 | Parthasarathy | ................. | 712/22 |
| 7,511,722 B1 * | 3/2009 | Ollmann | ........................ | 345/649 |
| 2005/0004958 A1 * | 1/2005 | Contini et al. | ................ | 708/200 |
| 2005/0108312 A1 * | 5/2005 | Chen et al. | .................... | 708/513 |
| 2005/0213842 A1 * | 9/2005 | Aldrich et al. | ................ | 382/264 |
| 2006/0133506 A1 * | 6/2006 | Dang | ........................ | 375/240.17 |
| 2010/0011339 A1 * | 1/2010 | Eichenberger et al. | ....... | 717/106 |

OTHER PUBLICATIONS

Siegel et al. "Parallel Processing Approaches to Image Correlation." IEEE Transactions on Computers, vol.c-31, No. 3, Mar. 1982, pp. 208-218.*
"Intel C++ Compiler for Linux Systems User's Guide", Intel Corporation, 2004, http://www.intel.com/software/products/compilers/clin/docs/ug_cpp/, 635 pages.
"Altivec Instruction Cross-Reference", Apple Inc., 2005,—http://developer.apple.com/hardwaredrivers/ve/instruction_crossref.html, 9 pages.
"ARM1136JF-S and ARM1136J-S Technical Reference Manual", ARM Ltd., 2006, http://infocenter.arm.com, 844 pages.
"MIPS32 Architecture for Programmers VolumeIV-E: The MIPS DSP Application-Specific Extension to the MIPS32 Architecture", MIPS Technologies, Inc., Jan. 6, 2009, http://www.mips.com, 231 pages.
Hank Dietz, "Technical Summary: SWAR Technology", 1997, http://cobweb.ecn.purdue.edu/~hankd/SWAR/over.html, 6 pages.
"Implementing SIMD in Software", Berkley Design Technology, Inc. (BDTI), Dec. 6, 2006, http://www.insidedsp.com/Articles/tabid/64/articleType/ArticleView/articleId/173/Implementing-SIMD-in-Software.aspx, 8 pages.

* cited by examiner

*Primary Examiner* — Jon Chang
(74) *Attorney, Agent, or Firm* — Oblon, Spivak, McClelland, Maier & Neustadt, L.L.P.

(57) ABSTRACT

A processor and associated methodology employ a SIMD architecture and instruction set to efficiently perform video analytics operation on images. The processor contains a group of SIMD instructions used by the method to implement video analytic filters that avoid bit expansion of the pixels to be filtered. The filters hold the number of bits representing a pixel constant throughout the entire operation, conserving processor capacity and throughput when performing video analytics.

17 Claims, 6 Drawing Sheets

ND, COMPUTER PROGRAM
PRODUCT AND ASSOCIATED
METHODOLOGY FOR VIDEO ANALYTICS

CROSS-REFERENCE TO RELATED
APPLICATION

This application contains subject matter related to co-pending U.S. patent application Ser. No. 12/275,832, entitled "Video Analytics System, Computer Program Product, and Associated Methodology for Efficiently Using SIMD Operations", filed on even date herewith, the entire contents of which is incorporated herein by reference.

This application also claims the benefit of the earlier filing date of U.S. Provisional Application Ser. No. 61/100,575 entitled "Video Analytics System, Computer Program Product, and Associated Methodology for Efficiently Using SIMD Operations", filed on Sep. 26, 2008, the entire contents of which is incorporated herein by reference.

BACKGROUND

1. Field of the Invention

The present disclosure relates to video and image processing, and, more specifically, a device and methodology for processing videos and images more efficiently.

2. Description of the Related Art

Video analytics or video content analysis range from video motion detection and audio detection, to more advanced systems including camera tampering detection, people counting, detection of objects crossing lines or areas of interest, vehicle license plate recognition, segmentation of video into foreground and background portions, tracking objects, traffic analysis, meta data extraction, biometric applications, and facial recognition. Video analytics also makes surveillance systems more intelligent to reduce vast amounts of image data to manageable levels. Intelligent video surveillance systems can for example automatically analyze and tag surveillance video in real-time, detect suspicious activities, initiate video recording, activate alarms or other actions to alert operators or other personnel.

In surveillance applications, video analytics is often used to detect motion. Motion detection is a way of defining activity in a scene by analyzing image data, and may be performed on a surveillance camera's entire field of view or on a user-defined area of interest. Furthermore, a video surveillance system with motion detection capabilities is able to detect motion more reliably than a human operator, and is therefore able to free human operators from staring at multiple video monitors for long hours. Instead, the video surveillance system with motion detection capabilities is able to alert the operator using a visual indicator, an audio indicator or both when motion is detected. Such a surveillance system may also automatically focus a surveillance camera on the area where motion was detected to obtain a more detailed image.

As recognized by the present inventor, a network camera capable of performing video analytics would reduce the work load of a centralized image processing system, and conserve valuable network bandwidth. Such a network camera would allow true event-driven surveillance systems where detection of motion by the camera may trigger predefined automatic processes, such as adjusting temperature, activating alarms, locking/unlocking doors, etc.

However, to extract information from images, video analytics methods frequently employ several relatively simple operations that operate on large amounts of pixel data. Filtering is among the most common of these operations, and also among the most processing-intensive. Conventional filters and conventional video analytics use twice as many bits as the number of bits in an input pixel to arrive at an accurate result. For example, the filtering of an 8-bit pixel uses 16-bits, and demands large amounts of processing resources, effectively halving a processor's processing capacity. Thus, as recognized by the present inventor, conventional video analytics methods are ill-suited for embedded applications, such as video analytics processing by a network camera.

Further, general purpose processors employ a Single Instruction, Single Data (SISD) architecture, and only process one pixel at a time. As recognized by the present inventor, this results in inherently poor performance when general-purpose processors are used for video analytics. FIG. 1 illustrates a typical register found in a general-purpose processor. In this example the SISD register 32 includes thirty-two bits (0-31), all of which represents a single number (i.e. a pixel value). For example, an 8-bit pixel whose bit values are all 1's is represented in FIG. 1 at bit positions 7-0. Bit positions 31-8 are padded with zeros. Though, the pixel is only 8 bits, it uses a full 32-bit register, which is an inefficient use of the "work" potential of the processor.

Some modern processors have evolved Single Instruction, Multiple Data (SIMD) instructions to improve performance. FIG. 2 illustrates a SIMD register 40 including 32 bits (0-31). However, the SIMD register 40 is divided into four 8-bit fields (41-42). Each of the 8-bit fields (41-42) can be packed with a pixel such that the 32-bit SIMD register 40 can be loaded with four pixels, allowing all four pixels in the SIMD register 40 to be processed simultaneously. SIMD processing instructions exist, for example, in Intel MMX, SSE and SSE2, PowerPC's Altivec, ARM Media Extensions and MIPS DSP ASE.

The performance increase brought about by conventional SIMD processors is, however, directly related to the number of pixels that can be packed into each of its SIMD registers. As described above, filtering operations can place large demands on a processor, and even SIMD Processors will not acheive their computational capacity if the pixel values are not efficiently packed in an instruction register.

FIG. 3 illustrates a 16-bit SIMD register 51 containing pre-filtered pixel data 50 corresponding to a first 8-bit pixel 53 and a second 8-bit pixel 52. As shown, the 16-bit SIMD register is able to accommodate two 8-bit pixels. However, if the contents of register 51 are filtered with filter 55, the result is two 16-bit filtered pixels (56 and 59). After filtering, according to conventional processes each pixel occupies a full register because the amount of storage space allocated to allow for overflow is conventionally double that of a number of bits used to represent a pixel. Even if the resulting pixels (56, 59) are truncated to 8 bits, processing capacity is still halved because the pixels are conventionally expanded to 16 bits to perform the filtering. Once expanded, the pixels are processed one at a time since the registers are only 16 bits wide, thus causing a processor bottleneck.

The increased processor throughput demand is more pronounced in processors used for embedded applications, such as video analytics locally performed in a network camera, where processing capacity is often traded for low power consumption. Moreover, as recognized by the present inventor, SIMD instruction sets are CPU-specific, and conventional SIMD processors lack a full array of SIMD functions for video analytics.

SIMD instructions may also be emulated in software. A general-purpose SISD register 32 can be made to function as a SIMD register 40 with additional software instructions to account for carry bits. For example, the SISD register 32 illustrated in FIG. 1 can be packed with four 8-bit pixels.

However, any computation performed on SISD register 32 will generate carry bits that will "bleed" from one pixel to the next, leading to possible errors. Conventionally, this is remedied with additional processing steps that account for any carry bits generated through computation, thus maintaining the partitioning of the pixels. Though not as efficient as a native SIMD processor, the benefits of processing multiple bits simultaneously outweigh the burden of the additional computation.

However, as in the case of a native SIMD processor, software emulated SIMD instructions, often referred to as SIMD Within A Register (SWAR), is also limited by the number of pixels that can be packed into a register, and therefore SWAR implemented SIMD instruction sets are also susceptible to a reduction in performance by processing-intensive video analytics functions, such as filtering operations.

SUMMARY OF THE INVENTION

The present disclosure provides a description of a video analytics processor, computer program product and associated methodology for efficiently implementing video analytics filters that avoid bit expansions.

A first aspect of the disclosure is a SIMD processor for video analytics that includes a plurality of registers partitioned into at least two fields, each field storing pixel data of a single pixel. The SIMD processor also includes an instruction decoder to decode a predetermined instruction set, and an arithmetic logic unit that performs operations corresponding to the decoded instructions on each field of the register being processed. The SIMD Processor also includes an I/O unit to communicate with external devices and a data bus to interconnect the registers, arithmetic logic unit and I/O unit.

Furthermore, the predetermined instruction set provides a rich array of instructions suited to video analytics, thus allowing for efficient implementation of filters that hold the number of pixel bits constant throughout their operation. More specifically, the instruction set includes at least a splice instruction and a doubled absolute value instruction.

A second aspect of the disclosure is a filtering method for video analytics using an n-pixel by n-pixel filter kernel, and including loading the pixels of a source image into a plurality of registers that are partitioned into at least two fields. Each register field corresponds to a single pixel. The filtering method also includes applying, in a data processor, the n-pixel by n-pixel filter kernel to the plurality of registers using SIMD instructions that operate on every field of a register simultaneously. The resulting partial results are combined in the data processor, again using SIMD instructions, to generate a final result. The final result is then output to either a display or an electronic storage medium.

A third aspect of the disclosure is a method for performing video analytics that includes partitioning a register into at least two fields, packing a pixel having a predetermined number of bits into each field of the register, and performing operations on the entire register. The operations performed on the register at least include a splice operation and an averaging operation.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings. However, the accompanying drawings and their exemplary depictions do not in any way limit the scope of the disclosure embraced by the specification. The scope of the disclosure embraced by the specification and drawings is defined by the claims.

DETAILED DESCRIPTION

Now referring to the accompanying drawings, a video analytics processor for efficiently implementing a video analytics filter includes a predetermined SIMD instruction set having a rich array of SIMD instructions for video analytics, which allow very efficient implementation of filters. These instructions result in video analytics functions, such as filters, that avoid expanding the number of bits representing a pixel.

Figure 4:
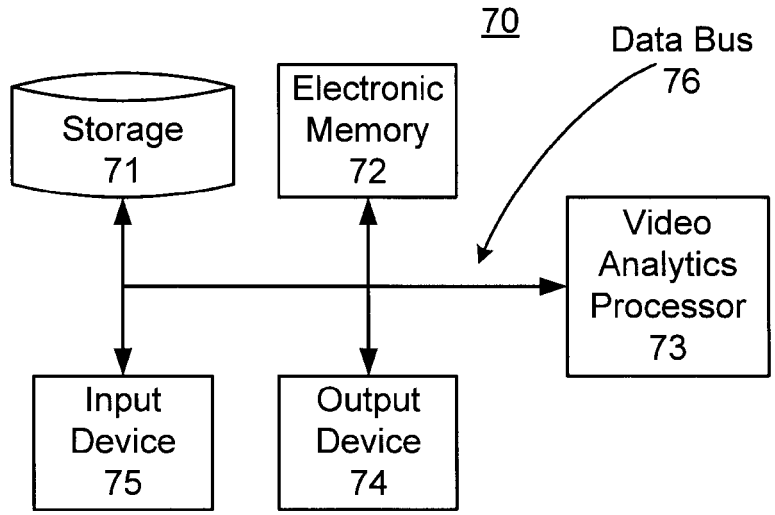
FIG. 4 is a schematic of an exemplary video analytics system.

FIG. 4 is a schematic representation of a video analytics system 70 including a video analytics processor according to an exemplary embodiment of the present disclosure. A video analytics processor 73 is connected to storage 71, an electronic memory 72, an input device 75 and an output device 74 through a data bus 76.

An example of the video analytics system of FIG. 4 include devices such as a PC (personal computer) employing an Intel Pentium Processor with an operating system such as Microsoft VISTA©, Unix, Solaris, Linux, Apple MAC-OS and other systems known to those skilled in the art. In this example, the storage 71 can be devices such as a hard disk drive, CD-ROM, recordable DVD, non-volatile memory, other semiconductor memory and the like. Further, the storage 71 may be permanently attached to the video analytics system or may be removable.

Examples of input devices 75 include a keyboard, mouse, track ball, still camera, video camera, microphone and other devices that are well known, and therefore omitted for brevity. An output devices 74 can be, for example, a video display.

The video analytics processor 73 may be implemented on a general-purpose processor using the methods herein described, or may be implemented on FPGA's, ASIC's, microcontrollers, PLD's or other computer readable media, such as an optical disk.

Figure 1:
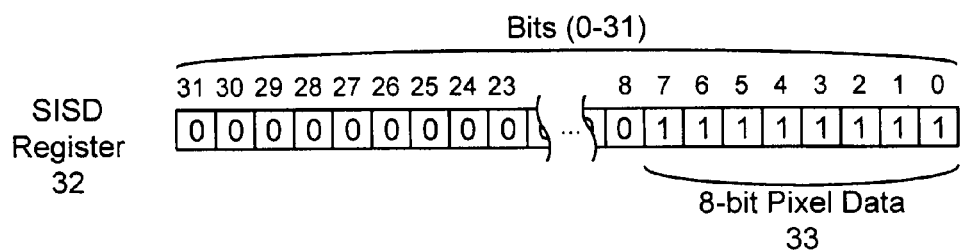
FIG. 1 is a schematic of a SISD Register.
Figure 2:
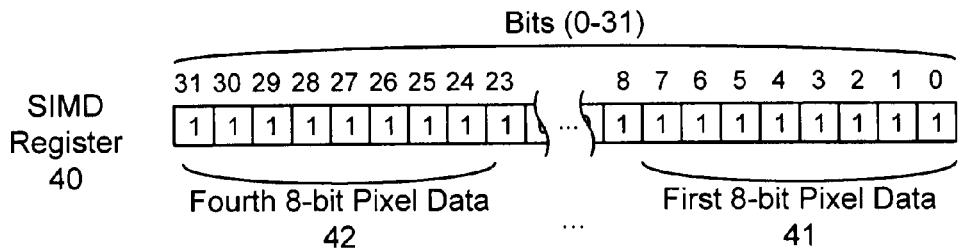
FIG. 2 is a schematic of a SIMD Register.
Figure 3:
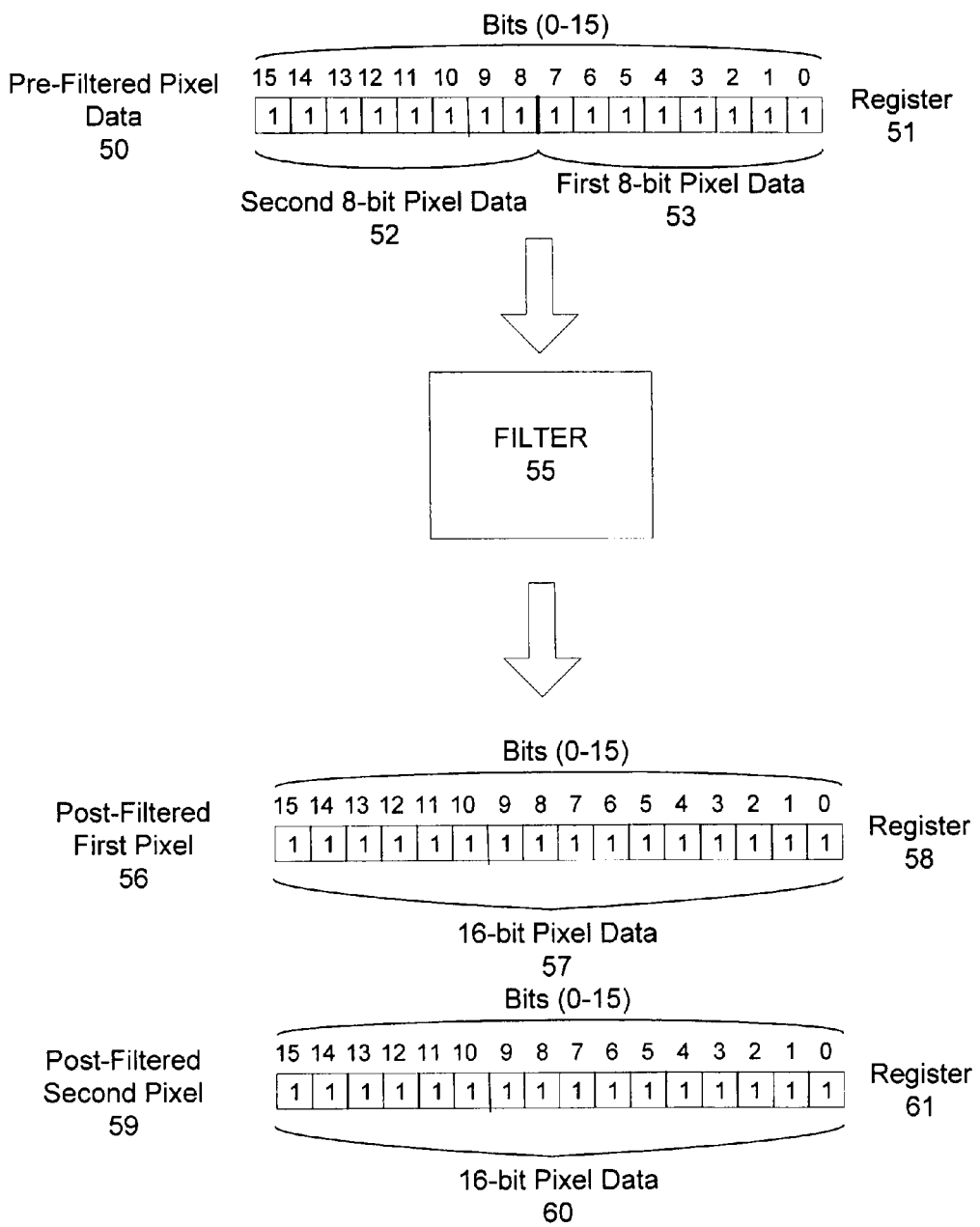
FIG. 3 is a schematic of filtering pixel data using a conventional video analytics filter on a SIMD processor.

The video analytics processor and video analytics methods described herein can also be used in, for example, the system discussed in FIG. 3 of U.S. application Ser. No. 12/275,832, the entire contents of which are incorporated herein by reference.

Figure 5:
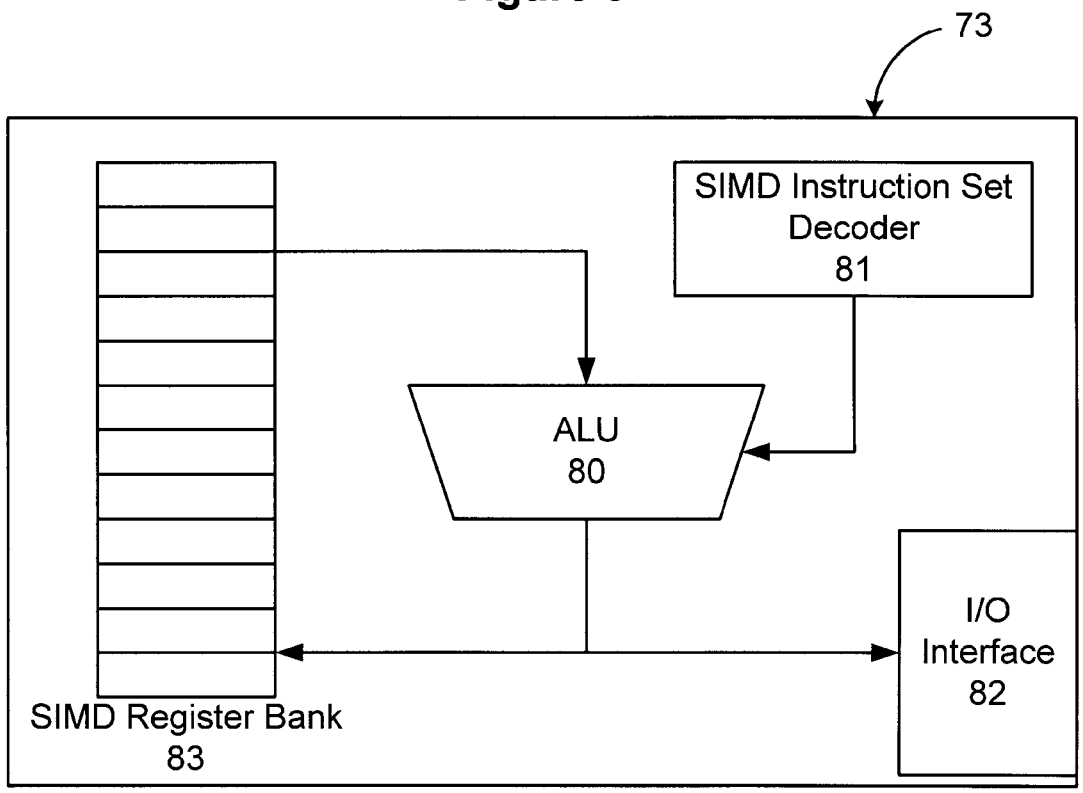
FIG. 5 is a schematic of a SIMD processor according to an exemplary embodiment of the present disclosure.

FIG. 5 is a schematic drawing of a video analytics processor according to an exemplary embodiment of the disclosure. The video analytics processor 73 includes a SIMD register bank 83, an arithmetic logic unit 80, an I/O interface 82 and a SIMD instruction set decoder 81. Other structures commonly found in processors such as clock generators, power controllers, peripherals and the like are well known, and their description has been omitted for brevity.

The SIMD register bank 83 contains a plurality of SIMD registers used by the ALU to perform data processing according to the instructions decoded by the SIMD instruction set decoder 81. Each of the SIMD registers in the SIMD register bank is divided into fields, and can therefore be packed with pixel data so that each field corresponds to a single pixel. In this way, multiple pixels may be processed simultaneously within a single register without carry bits from one pixel bleeding into and adjacent pixel.

In the case of a SIMD processor, bleeding of carry bits from one register field (i.e. pixel) to an adjacent register field (i.e. adjacent pixel) is prevented with parallel adders. For example, a SIMD processor may have 32-bit wide SIMD register divided into four equal fields of 8 bits per field. Such a processor may contain four 8-bit adders in parallel to simultaneously process each of the four register fields (and therefore each pixel) independently.

When SIMD is implemented on a conventional register using SWAR as described above, overflow from one pixel to an adjacent pixel may be anticipated by testing the most significant bits (MSB's) of each pixel to be processed, before the processing is performed. If the MSB's are set (i.e. equal to 1) an overflow can be expected. Thus, after processing is performed, a "1" may be subtracted from an adjacent pixel to eliminate the overflow bit. Alternatively, the carry bits and/or MSB's may be masked prior to processing.

The ALU 80 performs processing according to the SIMD instructions decoded by the SIMD instruction set decoder 81, in conjunction with the SIMD register bank 83.

The I/O interface 82 allows the video analytics processor 73 to communicate with external devices such as, for example, electronic memory. Examples of I/O interfaces include SPI, CAN, RS232, USB, but other communication protocols, well known in the art, are possible.

The SIMD instruction set decoder 81 decodes a predetermined instruction set that is particularly suited to video analytics processing. Included in the instruction set are instructions such as a "splice" instruction, a doubled absolute value instruction, an averaging instruction with a truncate result, and averaging instruction with a rounded result, and a linear interpolation function whose result is rounded towards a predetermined value.

For example, the averaging instruction may be implemented by computing the exclusive or of the two values to be averaged, and then shifting the result one bit to the right. The shifted result is then masked with a predetermined mask before being added to a result of a logical and operation on the two values to be averaged. In other words:

$$\frac{x+y}{2} = (x \& y) + (((x^\wedge y) >> 1) \& 0X7f7f7f7f7f)$$

As the logical "and" and "exclusive or" functions are well known, their description is omitted for brevity.

Because a right bit shift is performed in the above equation, the number values do not grow, and thus do not require additional bits for accurate representation.

Further, other functions can be constructed using the averaging function described above. For example, a half subtraction can be constructed as the average of a first value with the logical inverse of the second value, namely:

$$\text{sub}h(x,y) = \text{avg}(x,\bar{y})$$

As can be appreciated, other functions such as a saturated addition, saturated subtraction, comparison functions, and the like may also be implemented. Additionally, the averaging function may be implemented to generate a truncated result or a rounded result. Therefore, any function based on such an averaging function may also generate a truncated result or a rounded result.

The above list of instructions is merely exemplary of those contained in the predetermined instruction set decoded by the SIMD instruction decoder 81 of the present disclosure. Other instruction for video analytics or general processing may also be included in the instruction set without departing from the scope of the present disclosure, as can be appreciated by someone of ordinary skill in the art.

The processor of FIG. 5, using the above-described instruction set, may be used to implement a video analytics filter. An N×N video analytics filter is divided into rows (for horizontal filtering) and columns (for vertical filtering), and the vertical and horizontal filtering is performed separately.

Figure 6:
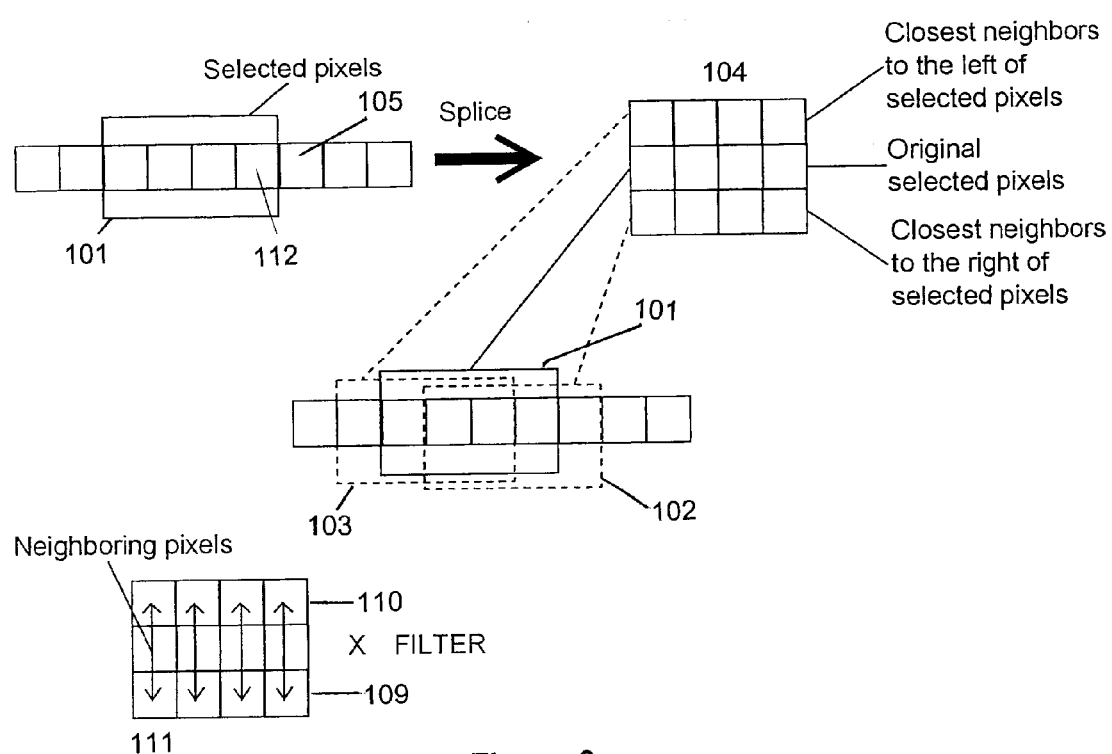
FIG. 6 is a schematic of dividing an image into columns and rows, and aligning pixels in preparation for filtering according an exemplary embodiment of the present disclosure.

For example, FIG. 6 is a schematic of video analytics filtering operation performed by software instructions implemented on the processor of FIG. 5 according to an exemplary embodiment of the present invention. In the case of vertical filtering, the pixels selected by selection window 101 are placed in matrix 111 along with the pixels 110 and pixels 109. In the image being filtered, pixels 110 are located directly above the pixels selected by selection window 101, and pixels 109 are located directly below. As a result, each pixel selected by selection window 101 is correctly aligned with its corresponding neighbors in pixels 110 and pixels 109, and the filter columns can be directly applied to the columns of matrix 111, as described below.

Figure 7:
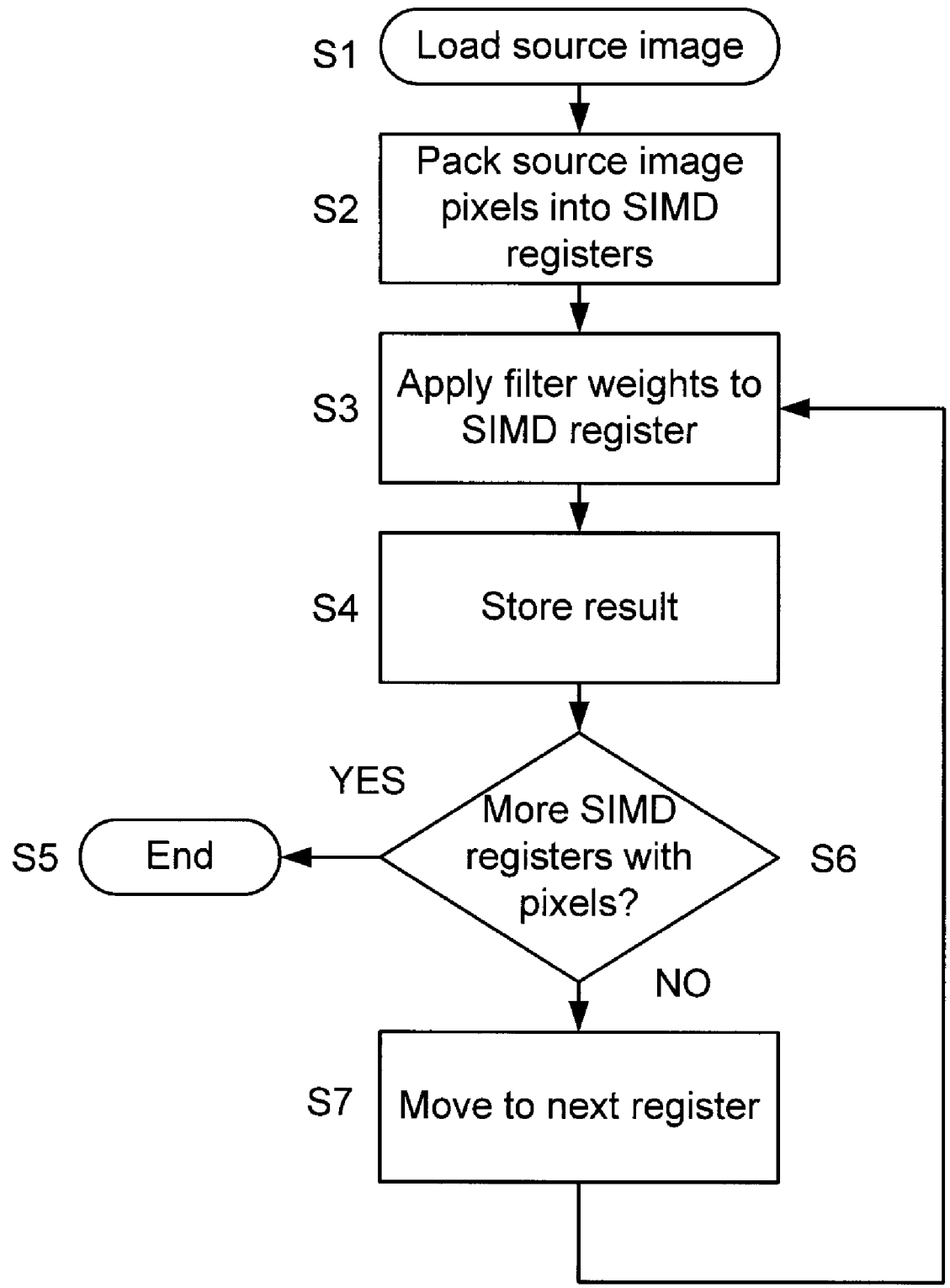
FIG. 7 is a flowchart of a video analytics filtering method according to an exemplary embodiment of the present disclosure.
Figure 8:
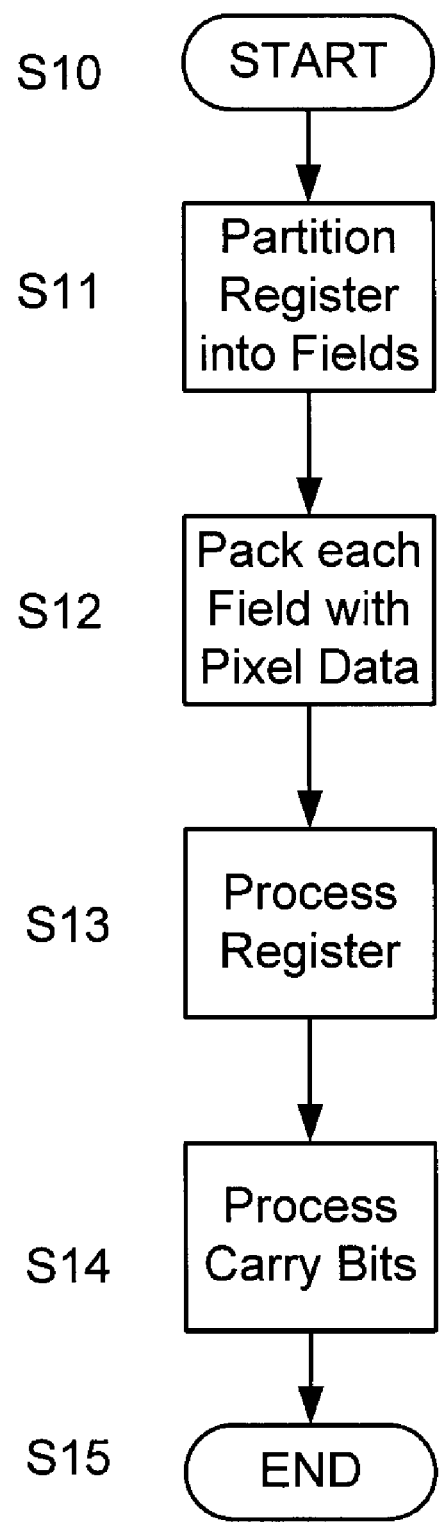
FIG. 8 is a flowchart of a method of emulating SIMD in software according to an exemplary embodiment of the present disclosure.

In the case of horizontal filtering, however, the pixels on the edge of the selection window 101 have only one neighbor. For example pixel 112 does not have a right-hand neighbor because pixel 105 is not within the selection window 101. Therefore, two other sets of pixels are selected by shifting the selection window to the left by one pixel (i.e. selection window 103) and to the right by one pixel (i.e. selection window 102). Then the pixels of selection windows 103 and 102 are spliced to the pixels of selection window 101 to generate the matrix 104. The matrix 104 has a top row of pixels corresponding to selection window 103, a middle row of pixels corresponding to selection window 101, and a bottom row of pixels corresponding to selection window 102, thus ensuring that every pixel selected by window 101 has two corresponding neighboring pixels. The filter may now be applied to matrix 104 to generate the horizontal partial result, as described below. FIG. 7 is a flowchart of image filtering according to an exemplary embodiment of the present disclosure. In step S1 of FIG. 7, the source image data is loaded into electronic memory, such as the electronic memory 72 of FIG. 4, in preparation for filtering. The source image pixels are then packed, at step S2, into SIMD registers of a SIMD processor, such as the SIMD Register Bank 83 of SIMD processor 73 in FIG. 5. The object of the packing step S2 is to arrange as many pixels as possible into a single register. For example, if each pixel is represented by 8 bits and each register is 32 bits wide, four pixels can be packed in each register. If, however, each pixel is represented by 16 bits, then only two pixels can be packed into a SIMD register that is 32 bits wide, but four of these pixels can be packed into a SIMD register that is 64 bits wide. As can be appreciated, any number of combinations of pixel and register bit sizes may be used without departing from the scope of this advancement.

In step 3, the pixel data is filtered using predetermined filter weights, as described below. The filtered data is stored at step S4, and step S6 determines whether there are more pixels to be filtered. If there are, the process moves to the next SIMD register that is packed with pixels at step S7, and repeats steps S3-S7 until step S6 determined that there are no more pixels to filter. Then the process ends at step S5. Next, the filtering process itself is described.

Conventionally, filters are accomplished through convolutions which expand half of the data to double the number of bits, multiply by the filter weights, accumulate and shift and truncate the result to 8-bits. However, in the present disclosure, as shown in FIG. 6, the pixels 91 which compose image 90 are held to 8-bit pixels throughout the entire filtering process to emerge as 8-bit filtered pixels 93 in register 94.

In FIG. 6, as described above, the data is separated into rows and columns allowing computation of partial results using the above-described averaging instruction which does not require any expansion of bits. Then the partial results are combined using the splice instruction to yield the filtered values, thereby avoiding the bit expansion and associated loss of processing throughput.

For example, a 3 by 3 Sobel gradient filter can be implemented using the processor executing these instructions. The kernel of a 3 by 3 Sobel filter is:

$$\begin{bmatrix} 1 & 0 & -1 \\ 2 & 0 & -2 \\ 1 & 0 & -1 \end{bmatrix}$$

The kernel may be separated into a horizontal component, for example:

$$[1\ 0\ -1]$$

and a vertical component, for example:

$$\begin{bmatrix} 1 \\ 2 \\ 1 \end{bmatrix}$$

Three SIMD register can be loaded with pixels corresponding to a previous, current and subsequent rows. For example, SIMD registers r0, r1 and r2 can be expressed as $$r0 = \begin{bmatrix} p_{0,t-1} \\ p_{0,t} \\ p_{0,t=1} \end{bmatrix}, r1 = \begin{bmatrix} p_{1,t-1} \\ p_{1,t} \\ p_{1,t=1} \end{bmatrix}, r2 = \begin{bmatrix} p_{2,t-1} \\ p_{2,t} \\ p_{2,t=1} \end{bmatrix}$$

A partial result, h0 can be expressed as:

$h0 = r0 + 2r1 + r2$

The above partial result can be implemented using the averaging functions included in the instruction set described above as:

$h0 = 4 \cdot \text{avg}(\text{avg}(r0,r2),r1)$

Several partial results can be computed as described above and spliced together using the splice instruction:

$h0' = \text{splice}(h0,h1,n-1)$ $h2' = \text{splice}(h1,h2,1)$ where n is the number of fields in a SIMD register, and the splice function is used to align selected pixels to their neighboring pixels as discussed above. The final result is generated with a half subtraction of h2'−h0'. Thus, expansion of, for example 8-bit pixels to 16-bits can be avoided.

Similarly, other kernels such as those for Laplace and high-pass filters can be similarly implemented. In addition, the same technique can be used when the filter kernel is larger than 3 by 3, for example 5 by 5, using linear interpolation.

In another embodiment the video analytics processor can be emulated on general-purpose processors using SWAR techniques in order to implement video analytics filtering as described above.

In another embodiment, a computer readable medium can be coded with instructions that cause a processor to perform video analytics as described above.

SIMD processors currently available lack instruction sets suited for efficient implementation of video analytics functions. The present inventor recognized that a SIMD processor having an instruction set optimized to avoid pixel bit expansion while maintaining accurate results, yields significantly improved performance. This improvement is unexpected as others had not recognized that bit expansion during pixel processing can be avoided in order to approximately double performance without significantly affecting accuracy. In light of recognizing the source of the problem, the present solution disclosed herein of a SIMD processor with a rich instruction set for video analytics, avoids bit expansions during pixel processing and thus results in significantly improved video analytics processing efficiency.

The foregoing discussion discloses merely exemplary embodiments of the present disclosure. As will be understood by those skilled in the art, the present advancement may be embodied in other specific forms without departing from the spirit or essential characteristics thereof. Accordingly, the disclosure of the present invention is intended to be illustrative, but not limiting of the scope of the advancement, as well as other claims. The disclosure, including any readily discernible variants of the teachings herein, define, in part, the scope of the foregoing terminology such that no inventive subject matter is dedicated to the public.

The invention claimed is:

1. A processor for video analytics comprising:
   a plurality of registers each partitioned into at least two fields, each field being configured to store pixel data corresponding to an individual pixel;
   an instruction decoder configured to decode SIMD instructions from a predetermined SIMD instruction set, the predetermined SIMD instruction set including at least a splice instruction, an averaging instruction and a half subtraction instruction, the splice instruction combining pixels from a single row to generate a pixel matrix having more than one row;
   an arithmetic-logic unit configured to perform operations corresponding to the decoded SIMD instructions on each of the plurality of registers, each operation being simultaneously performed on each field in a register without causing carry bits to bleed from one field in the register to an adjacent field in the register;
   an I/O unit configured to interface with at least one external device and configured to receive data from and transmit data to the external device; and
   a data bus configured to interconnect the plurality of registers, the arithmetic-logic unit and the I/O unit.

2. The processor for video analytics according to claim 1, wherein the predetermined instruction set also includes a linear interpolation instruction with a result rounded towards a predetermined value.

3. The processor for video analytics according to claim 2, wherein the linear interpolation instruction is rounded towards zero.

4. The processor for video analytics according to claim 1, wherein the predetermined instruction set includes an n-pixel by n-pixel filtering instruction, the filtering instruction holding a number of bits per pixel constant during filtering.

5. The processor for video analytics according to claim 1, wherein the arithmetic-logic unit includes at least two parallel adders, each of the parallel adders corresponding to one of the at least two fields.

6. A filtering method for video analytics using an n-pixel by n-pixel filter, the filtering method comprising:
packing a source image including a plurality of pixels into a plurality of registers, each of said plurality of registers being partitioned into at least two fields, each field corresponding to a single pixel, and each pixel including a predetermined number of bits;
applying, in a data processor, an n-pixel by n-pixel filter kernel to the plurality of registers using SIMD instructions to generate a plurality of partial results, said SIMD instructions including at least a splice instruction, an averaging instruction and a half subtraction instruction, the splice instruction combining pixels from a single row to generate a pixel matrix having more than one row;
combining the partial results, in a data processor, using SIMD instructions to generate a final result; and
outputting the final result to at least one of a display and an electronic storage medium, wherein the predetermined number of bits is held constant throughout the filtering method.

7. The filtering method according to claim 6, wherein when n equals three, the packing step includes
dividing the source image into a plurality of vertical components and a plurality of horizontal components,
dividing the filter kernel into three vertical components and three horizontal components, and
the applying step includes successively averaging the vertical components in combinations corresponding to filter weights included in the three filter kernel vertical components to generate a vertical partial result,
successively averaging the horizontal components in combinations corresponding to filter weights included in the three filter kernel horizontal components to generate a horizontal partial result, and
combining the vertical and horizontal partial results using a half-subtraction-with-bias operator to generate a filtered result.

8. The filtering method according to claim 7, wherein when n is greater than three, the SIMD instructions include a linear interpolation instruction, and the vertical and partial results are computed using the linear interpolation instruction.

9. A method of performing video analytics comprising:
partitioning a register into at least two fields;
packing a pixel, including a predetermined number of bits, into each field of the register; and
performing SIMD instructions on the entire register, the SIMD instructions corresponding to a predefined SIMD instruction set including at least a splice instruction, an averaging instruction and a half subtraction instruction, wherein the splice instruction combines pixels from a single row to generate a pixel matrix having more than one row.

10. The method of performing video analytics according to claim 9, further comprising:
masking the register with a predetermined mask to prevent carry bits from crossing fields.

11. A processor for video analytics comprising:
means for storing pixel data contiguously;
means for decoding SIMD instructions from a predetermined SIMD instruction set, the SIMD instruction set including at least a splice instruction, an averaging instruction and a half subtraction instruction, the splice instruction combining pixels from a single row to generate a pixel matrix having more than one row;
means for performing operations, corresponding to the decoded instructions, simultaneously on the contiguously stored pixel data, each pixel data contiguously stored being insulated from carry bits of other pixel data contiguously stored;
means for receiving data from an external device, and
means for transmitting data to an external device.

12. The processor for video analytics according to claim 11, wherein the predetermined SIMD instruction set also includes a linear interpolation instruction with a result rounded towards a predetermined value.

13. The processor for video analytics according to claim 12 wherein the linear interpolation instruction is rounded towards zero.

14. The processor for video analytics according to claim 13, wherein the predetermined SIMD instruction set includes an n-pixel by n-pixel filtering instruction, the filtering instruction holding a number of bits, corresponding to an input argument, constant during filtering.

15. A non-transitory computer-readable storage medium having computer-readable instructions stored thereon, the computer-readable instruction when executed by a computer cause the computer to perform the steps comprising:
partitioning each register of a plurality of registers into a plurality of fields, each register including at least two fields;
packing a source image including a plurality of pixels into the plurality of registers, each field corresponding to a single pixel, each pixel including a predetermined number of bits;
applying an n-pixel by n-pixel filter kernel to the plurality of registers using SIMD instructions to generate a plurality of partial results, said SIMD instructions including at least a splice instruction, an averaging instruction and a half subtraction instruction, the splice instruction combining pixels from a single pixel row to generate a pixel matrix having more than one row;
combining the partial results, in a data processor, using the SIMD instructions to generate a final result; and
outputting the final result to at least one of a display and an electronic storage medium, wherein
the predetermined number of bits of each pixel is held constant in the applying step and the combining step.

16. The non-transitory computer-readable storage medium according to claim 15, wherein when n equals three, the packing step includes
dividing the source image into a plurality of vertical components and a plurality of horizontal components,
dividing the filter kernel into three vertical components and three horizontal components, and
the applying step includes successively averaging the vertical components in combinations corresponding to filter weights included in the three filter kernel vertical components to generate a vertical partial result,
successively averaging the horizontal components in combinations corresponding to filter weights included in the three filter kernel horizontal components to generate a horizontal partial result, and combining the vertical and horizontal partial results using a half-subtraction-with-bias operator to generate a filtered result.

17. The non-transitory computer-readable storage medium according to claim 16, wherein when n is greater than three, the SIMD instructions include a linear interpolation instruction, and the vertical and horizontal partial results are computed using the linear interpolation instruction.

* * * * *